(12) United States Patent
Valko et al.

(10) Patent No.: US 8,070,927 B2
(45) Date of Patent: Dec. 6, 2011

(54) STABILIZING AQUEOUS ANIONIC RESINOUS DISPERSIONS WITH CHELATING AGENTS

(75) Inventors: Joseph T. Valko, Pittsburgh, PA (US); Craig A. Wilson, Allison Park, PA (US); Robin M. Peffer, Valencia, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 1147 days.

(21) Appl. No.: 11/839,142

(22) Filed: Aug. 15, 2007

(65) Prior Publication Data
US 2009/0045065 A1 Feb. 19, 2009

(51) Int. Cl.
*C25D 13/06* (2006.01)
*C08L 63/00* (2006.01)

(52) U.S. Cl. .......... 204/496; 523/400
(58) Field of Classification Search .......... 204/492–498, 204/296; 523/400
See application file for complete search history.

(56) References Cited

U.S. PATENT DOCUMENTS

| | | | |
|---|---|---|---|
| 3,556,968 A * | 1/1971 | DeVittorio | 204/489 |
| 5,021,135 A | 6/1991 | Wilson et al. | 204/180.8 |
| 5,250,325 A | 10/1993 | Phillips et al. | 427/386 |
| 5,277,709 A | 1/1994 | Armstrong et al. | |
| 6,248,225 B1 * | 6/2001 | Palaika et al. | 204/484 |
| 2003/0004231 A1 | 1/2003 | Ehmann et al. | 523/400 |

FOREIGN PATENT DOCUMENTS

| | | |
|---|---|---|
| CN | 1259553 A | 7/2000 |
| EP | 0 174 628 B1 | 12/1991 |
| EP | 0 469 491 B1 | 1/1995 |
| EP | 1 213 334 A1 | 6/2002 |
| EP | 1 319 033 B1 | 4/2007 |
| JP | 60063261 A | 4/1985 |
| WO | WO 91/19837 | 12/1991 |

* cited by examiner

*Primary Examiner* — Kishor Mayekar
(74) *Attorney, Agent, or Firm* — Donald Palladino

(57) ABSTRACT

Stabilization of aqueous resinous dispersions containing a pigment of a divalent metal such as strontium chromate is disclosed. Stabilization is achieved by incorporating a chelating agent in the dispersion.

24 Claims, No Drawings

STABILIZING AQUEOUS ANIONIC RESINOUS DISPERSIONS WITH CHELATING AGENTS

FIELD OF THE INVENTION

The present invention relates to aqueous anionic dispersions containing pigment of divalent metals and to the stabilization of these dispersions.

BACKGROUND OF THE INVENTION

Aqueous anionic resinous dispersions containing pigments of divalent metals such as strontium chromate are well known for coating aluminum substrates where the strontium chromate provides for outstanding corrosion protection. Unfortunately, these dispersions are unstable. It is believed the divalent metal cation causes the anionic resin to settle out from the dispersion. It would be desirable to stabilize such aqueous resinous dispersions.

SUMMARY OF THE INVENTION

In accordance with the present invention, aqueous anionic resinous dispersions comprise a pigment of a divalent metal, particularly pigments of divalent metals that also contain chromium. Such pigments, such as strontium chromate, are stabilized by adding to the dispersion a chelating agent. The stabilized aqueous dispersions are particularly useful in the process of anionic electrodeposition, and more particularly, for electrodepositing corrosion resistant coatings over aluminum substrates. In addition, including in the bath an azole corrosion inhibitor can minimize the presence of chromium-containing pigments in the bath.

DETAILED DESCRIPTION

The resin associated with the aqueous dispersion is preferably an anionic resin. Preferred anionic resins are phosphated epoxy resins.

The phosphated epoxy resins useful herein are ungelled and typically are prepared as follows. An epoxy-containing material, such as a polyepoxide is reacted with a phosphorus acid such as a phosphoric acid or an equivalent thereof. The polyepoxide useful herein can be a compound or a mixture of compounds having more than 1.0 epoxy groups per molecule. Several polyepoxides are known in the art. Examples of the polyepoxides can be found in the Handbook of Epoxy Resins, Lee and Neville, 1967, McGraw-Hill Book Company.

A preferred class of polyepoxides is the polyglycidyl ethers of polyphenols, such as bisphenol A. These are produced by etherification of a polyphenol with an epichlorohydrin in the presence of an alkali. The phenolic compound can be 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another useful class of polyepoxides is produced similarly from polyphenol resins.

In addition to the polyepoxides described above, there can also be employed addition polymerization polymers containing pendant epoxy groups. These polymers are made by copolymerizing a variety of polymerizable ethylenically unsaturated monomers at least one of which is an epoxy containing monomer, e.g., glycidyl acrylate or glycidyl methacrylate.

A suitable ethylenically unsaturated monomer that does not contain a group that is reactive with the epoxy group can be employed herein as a comonomer. The preferred monomers include alpha, beta-ethylenically unsaturated monomers, e.g., unsaturated carboxylic acid esters of saturated alcohols containing from 1 to about 8 carbon atoms, and monovinyl aromatic monomers such as styrene and vinyl toluene.

The preferred polyepoxides have epoxy equivalent weight of about 172 to 5000 and preferably 300 to 1000.

In addition to the polyepoxides, the reaction mixture can contain a monomeric monoepoxide such as monoglycidyl ethers of alcohols and phenols, such as phenyl glycidyl ether, and glycidyl esters of monocarboxylic acids such as glycidyl neodecanoate.

The phosphoric acid that is reacted with the epoxy-containing material can be a 100 percent orthophosphoric acid or a phosphoric acid aqueous solution such as is referred to as an 85 percent phosphoric acid. Other forms of phosphoric acid such as superphosphoric acid, diphosphoric acid and triphosphoric acid can be employed herein. Also, the polymeric or partial anhydrides of phosphoric acids can be employed. Typically, aqueous phosphoric acids that are of about 70 to 90 percent and preferably about 85 percent phosphoric acid are employed.

Besides phosphoric acid, phosphonic acids or phosphinic acids can also be reacted with the epoxy-containing material. Examples of phosphonic acids are organophosphonic acids of the structure:

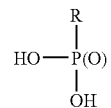

wherein R is organic radical such as those having a total of 1-30, such as 6-18 carbons. R can be aliphatic, aromatic or mixed aliphatic/aromatic and can be an unsubstituted hydrocarbon or a substituted hydrocarbon.

Examples of phosphinic acids are organophosphinic acids of the structure:

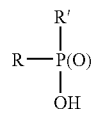

wherein preferably, R and R' are each independently hydrogen or organic radicals. Examples of such radicals are those having a total of 1-30, such as 6-18 carbons. The organic component of the phosphinic acid (R, R') can be aliphatic, aromatic or mixed aliphatic/aromatic. R and R' can be an unsubstituted hydrocarbon or a substituted hydrocarbon.

Representative of the organophosphonic acids are as follows: propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid.

Also, mixtures of phosphorus acids such as mixtures of phosphoric and phosphonic acids may be used.

The reaction of the polyepoxide with the phosphorus acid or mixture of acids is typically conducted in organic solvent by mixing the polyepoxide with the phosphorus acid(s) and heating optionally in the presence of catalyst such as an onium salt at elevated temperature for 30 to 90 minutes to complete the reaction. The relative amounts of the polyepoxide and the phosphorus acid(s) that are reacted with one another are as follows: for each equivalent of epoxy, there are at least 0.1 mole, and typically 0.1 to 0.2 moles of phosphorus acid(s). The epoxy-phosphorus acid reaction products typically have an acid value of 10 to 60, preferably 15 to 50 based on resin solids.

Besides reacting the epoxy-containing material with a mixture of phosphorus acids such as phosphoric acid and phosphonic acid, the polyepoxide can be reacted separately with the phosphoric acid and with the phosphonic acid. The various reaction products can then be combined.

Examples of other anionic resins are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, such as hydroxyethyl acrylate and/or hydroxymethyl methacrylate, unsaturated carboxylic acid, such as acrylic or methacrylic acid, and at least one other ethylenically unsaturated monomer, such as lower alkyl esters of acrylic and methacrylic acid, for example, ethyl acrylate and butyl methacrylate. Such interpolymers or resins are commonly referred to as (meth)acrylic resins. Still other suitable anionic resins are alkyd-aminoplast vehicles, i.e., a vehicle containing an alkyd resin and an amine-aldehyde resin. Yet other anionic resins are mixed esters of a resinous polyol. These compositions are described in detail in U.S. Pat. No. 3,749,657 at col. 9, lines 1 to 75 and col. 10, lines 1 to 13.

The anionic resin is present in the dispersion in amounts of 30 to 80 percent by weight based on weight of solids in the aqueous dispersion.

The anionic resin is typically used with a curing agent such as an aminoplast or a phenolplast resin. The useful aminoplast resins of this invention are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are preferred herein.

Illustrative but non-limiting examples of useful aminoplast resins are those available under the trademark CYMEL from Cytec Industries and RESIMENE from Solutia Inc. Specific examples are CYMEL 1130 and 1156 and RESIMENE 750 and 753.

The relative amount of the (a) anionic resin and (b) curing agent is from 50 to 90, preferably 60 to 75 percent by weight anionic resin, and from 10 to 50, preferably 25 to 40 percent by weight curing agent based on solids weight of (a) and (b).

In adapting the resinous composition to be a water-based and electrophoretic composition, it is neutralized with a base. The bases useful herein can be organic or inorganic. Illustrative examples of the bases are ammonia, sodium hydroxide, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. The percent of neutralization is such as would make the resinous blends water-dispersible and electrophoretic. Typically, the resinous blend is at least partially neutralized from about 40 to 150 percent and preferably 60 to 120 percent neutralization.

The aqueous resinous dispersions also contain one or more pigments of a divalent metal. Examples of suitable divalent metals are calcium, magnesium, strontium and barium. Preferably, the pigment also contains chromium. Examples of such pigments are calcium chromate, magnesium chromate, strontium chromate and barium chromate. Such chromium pigments are particularly desirable in anionic resinous dispersions for electrodeposition over aluminum substrates. The divalent metal pigment typically is present in the aqueous dispersion in amounts up to 10 percent, more typically 0.01 to 5 percent by weight based on weight of the aqueous resinous dispersion.

When the divalent metal pigment is chromium containing, the pigment level should be minimized within the above ranges. Accordingly, to supplement the chromium-containing pigment, an organic corrosion inhibitor that is environmentally friendly is preferably present in the aqueous dispersion. Preferred corrosion inhibitors are azoles, that is, 5-membered N-heterocyclic compounds that contain in the heterocyclic ring two double bonds, a nitrogen atom, one or more carbon atoms and optionally a sulfur atom. The preferred azole is benzotriazole. Examples of other azoles are 5-methyl benzotriazole and 2-aminothiazole. Typically, the azole is present in the aqueous dispersion in amounts of at least 0.05, more typically 0.05 to 10 percent by weight based on weight of the aqueous resinous dispersion.

As mentioned above, the aqueous anionic resinous dispersions containing the divalent metal pigment are unstable. To stabilize the dispersion, a chelating agent is added to the dispersion. It is believed the chelating agent forms a complex with the divalent metal cation, which prevents the divalent metal cation from interacting with the anionic resin causing it to settle out.

By the term "chelating agent" is meant a compound that has the ability to bond to a metal ion through two or more atoms of the chelating agent to form a complex or a reaction product. The bonds may be covalent or ionic or a combination thereof. Examples of suitable chelating agents include acidic materials such as ethylenediamine tetraacetic acid, nitrilo triacetic acid and sodium tripolyphosphate. The chelating agent typically is added to the aqueous dispersion such that the weight ratio of chelating agent to divalent metal pigment is from 0.01 to 0.5:1.

Besides the anionic resin, divalent metal pigment, chelating agent and optionally the azole corrosion inhibitor, the aqueous dispersion may contain optional ingredients such as other corrosion inhibitors, other pigments, anti-oxidants, catalyst, flow control agents, surfactants and cosolvents as mentioned in more detail below. These ingredients, if present, are present in amounts of about 0.1 to 25 percent by weight based on weight of the aqueous dispersion.

The aqueous dispersions of the invention are particularly useful in the application of coatings to substrates by the process of electrodeposition. Examples of suitable substrates are metals such as steel, including cold rolled steel and galvanized steel, and aluminum, which is a preferred substrate.

The metal substrates can also be treated such as by the application of a metal phosphate or a chromate conversion coating.

The aqueous dispersions are believed to be a two-phase transparent, translucent or opaque system in which the solids of the composition is in the dispersed phase and the water is in the continuous phase. The average particle size of the solids phase is generally less than 1.0 and usually less than 0.5 microns, preferably less than 0.15 micron.

When the aqueous dispersions of the present invention are in the form of electrodeposition baths, the solids content of the electrodeposition bath are usually within the range of about 5 to 25 percent by weight based on total weight of the electrodeposition bath.

Besides water, the aqueous medium may contain a co-diluent such as a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol.

When the aqueous dispersions as described above are employed for use in electrodeposition, the aqueous dispersion is placed in contact with an electrically conductive anode and an electrically conductive cathode, with the surface to be coated being the anode. Following contact with the aqueous dispersion, an adherent film of the coating composition is deposited on the substrate when a sufficient voltage is impressed between the electrodes. The applied voltage may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After electrocoating, the substrate is removed from the electrodeposition bath and heated to cure the coating. Curing temperatures and times of 90 to 150° C. for 15 to 60 minutes are typical.

Illustrating the invention are the following examples that, however, are not to be considered as limiting the invention to their details. Unless otherwise indicated, all parts and percentages in the following examples, as well as throughout the specification, are by weight.

EXAMPLES

Example 1 (Control)

Anionic Resinous Dispersion with No Chelating Agent

A mixture of 824.2 parts of bisphenol A diglycidyl ether (EEW 188), 265.1 parts of bisphenol A, and 210.7 parts of 2-n-butoxy-1-ethanol was heated to 115° C. At that point, 0.8 parts of ethyl triphenylphosphonium iodide was added. This mixture was heated and held at a temperature of at least 165° C. for one hour. As the mixture was allowed to cool to 88° C., 51.6 parts of Ektasolve EEH solvent (available from Eastman Chemical Company) and 23.4 parts of 2-n-butoxy-1-ethanol were added. At 88° C., 39.2 parts of 85% o-phosphoric acid and 6.9 parts of Ektasolve EEH were added, and the reaction mixture was subsequently maintained at a temperature of at least 120° C. for 30 min. At that point, the mixture was cooled to 100° C. and 72.0 parts of deionized water was introduced gradually. Once the water addition was completed, a temperature of about 100° C. was maintained for 2 hours. Then the mixture was cooled to 90° C. and 90.6 parts of diisopropanolamine was added, followed by 415.5 parts of Cymel 1130 methylated/butylated melamine formaldehyde resin (available from Cytec Industries, Inc.). After 30 min. of mixing, 1800 parts of this mixture was reverse-thinned into 1497.8 parts of agitated deionized water. An additional 347.1 parts of deionized water was added to yield a homogeneous dispersion, which evidenced a solids content of 41.9% after 1 hour at 110° C.

Example 2

Anionic Resinous Dispersion with 0.36% EDTA

A mixture of 792.6 parts of bisphenol A diglycidyl ether (EEW 188), 254.9 parts of bisphenol A, and 202.6 parts of 2-n-butoxy-1-ethanol was heated to 115° C. At that point, 0.8 parts of ethyl triphenylphosphonium iodide was added. This mixture was heated and held at a temperature of at least 165° C. for one hour. As the mixture was allowed to cool to 88° C., 49.6 parts of Ektasolve EEH solvent and 22.5 parts of 2-n-butoxy-1-ethanol were added. At 88° C., 37.7 parts of 85% o-phosphoric acid and 6.6 parts of Ektasolve EEH were added, and the reaction mixture was subsequently maintained at a temperature of at least 120° C. for 30 min. At that point, the mixture was cooled to 100° C. and 69.2 parts of deionized water was introduced gradually. Once the water addition was completed, a temperature of about 100° C. was maintained for 2 hours. Then the mixture was cooled to 90° C. and 87.1 parts of diisopropanolamine was added, followed by a mixture of 9.9 parts of diisopropanolamine with 5.4 parts of ethylenediamine tetraacetic acid and 61.4 parts deionized water, and then 399.6 parts of Cymel 1130 methylated/butylated melamine formaldehyde resin. After 30 min. of mixing, 1800 parts of this mixture was reverse-thinned into 1382.9 parts of agitated deionized water. An additional 335.0 parts of deionized water was added to yield a homogeneous dispersion, which evidenced a solids content of 41.8% after 1 hour at 110° C.

Example 3

Aqueous Resinous Dispersion with 0.73% EDTA

A mixture of 792.6 parts of bisphenol A diglycidyl ether (EEW 188), 254.9 parts of bisphenol A, and 202.6 parts of 2-n-butoxy-1-ethanol was heated to 115° C. At that point, 0.8 parts of ethyl triphenylphosphonium iodide was added. This mixture was heated and held at a temperature of at least 165° C. for one hour. As the mixture was allowed to cool to 88° C., 49.6 parts of Ektasolve EEH solvent and 22.5 parts of 2-n-butoxy-1-ethanol were added. At 88° C., 37.7 parts of 85% o-phosphoric acid and 6.6 parts of Ektasolve EEH were added, and the reaction mixture was subsequently maintained at a temperature of at least 120° C. for 30 min. At that point, the mixture was cooled to 100° C. and 69.2 parts of deionized water was introduced gradually. Once the water addition was completed, a temperature of about 100° C. was maintained for 2 hours. Then the mixture was cooled to 90° C. and 87.1 parts of diisopropanolamine was added, followed by a mixture of 19.8 parts of diisopropanolamine with 10.9 parts of ethylenediamine tetraacetic acid (EDTA) and 122.8 parts deionized water, and then 399.6 parts of Cymel 1130 methylated/butylated melamine formaldehyde resin. After 30 min. of mixing, 1800 parts of this mixture was reverse-thinned into 1276.5 parts of agitated deionized water. An additional 323.8 parts of deionized water was added to yield a homogeneous dispersion, which evidenced a solids content of 42.1% after 1 hour at 110° C.

The three dispersions were made into three paints by combining 119.5 parts deionized water, 0.04 parts Tektronic 150R1 surfactant (available from BASF Corporation), 14.2 parts of ACPP-1120 grey pigment paste (available from PPG Industries, Inc., 51% solids), and 5.2 parts of a pigment paste at 49.5% solids of which 66.7% of the solids was strontium chromate pigment, with 81.5 parts of the dispersion containing no EDTA (Paint A), 81.7 parts of the dispersion containing 0.36% EDTA (Paint B), and, 81.1 parts of the dispersion containing 0.72% EDTA (Paint C), respectively.

The three paints were evaluated for tendency to settle on a BYK Chemie Type 1912 Dynometer over three hours. The milligrams of sediment collected in each paint is indicated in Table I.

TABLE I

| Paint A | 377.4 mg. |
| Paint B | 330.5 mg. |
| Paint C | 294.9 mg. |

Whereas particular embodiments of this invention have been described above for purposes of illustration, it will be evident to those skilled in the art that numerous variations of the details of the present invention may be made without departing from the invention as defined in the appended claims.

What is claimed is:

1. An aqueous resinous dispersion comprising:
   (1) an anionic resin,
   (2) a pigment of a divalent metal cation, and
   (3) a chelating agent capable of reacting with the pigment, wherein the pigment is in the aqueous resinous dispersion in the absence of contacting the dispersion with a surface to be coated.

2. The aqueous dispersion of claim 1 in which the anionic resin is the reaction product of a polyepoxide and a phosphorus acid.

3. The aqueous dispersion of claim 2 in which the polyepoxide is a polyglycidyl ether of a polyhydric phenol.

4. The aqueous dispersion of claim 2 in which the phosphorus acid is selected from phosphoric acid, organophosphonic acid and mixtures thereof.

5. The aqueous dispersion of claim 1 in which the anionic resin is present in amounts of 30 to 80 percent by weight based on weight of solids in the dispersion.

6. The aqueous dispersion of claim 1 in which the divalent metal cation is selected from calcium, strontium, magnesium and barium.

7. The aqueous dispersion of claim 1 in which the pigment contains chromium.

8. The aqueous dispersion of claim 7 in which the pigment is strontium chromate.

9. The aqueous dispersion of claim 1 which contains up to 10 percent by weight pigment based on weight of the aqueous dispersion.

10. The aqueous dispersion of claim 1 in which the chelating agent is ethylenediamine tetraacetic acid.

11. The aqueous dispersion of claim 1 in which the chelating agent is added to the aqueous dispersion such that the weight ratio of chelating agent to pigment is from 0.01 to 5:1.

12. The aqueous dispersion of claim 1 that contains an azole.

13. The aqueous dispersion of claim 12 in which the azole is benzotriazole.

14. The aqueous dispersion of claim 12 in which the azole is present in the aqueous dispersion in amounts of at least 0.05 percent by weight based on weight of the aqueous dispersion.

15. A method of electrocoating an electrically conductive substrate serving as an anode in an electrical circuit comprising the anode and a cathode that are immersed in an aqueous resinous dispersion comprising passing electric current between the anode and the cathode to cause a resinous composition to deposit on the anode, characterized in that the aqueous dispersion comprises:
   (a) an anionic resin and
   (b) the reaction product of:
      (i) a pigment of a divalent metal cation, and
      (ii) a chelating agent,
   wherein the pigment is in the aqueous resinous dispersion before the dispersion is placed in contact with the electrically conductive substrate.

16. The method of claim 15 in which the anionic resin is the reaction product of a polyepoxide and a phosphorus acid.

17. The method of claim 15 in which the anionic resin is present in amounts of 30 to 80 percent by weight based on weight of solids in the aqueous dispersion.

18. The method of claim 15 in which the divalent metal cation is selected from calcium, magnesium, strontium and barium.

19. The method of claim 15 in which the pigment contains chromium.

20. The method of claim 15 in which the pigment is present in the aqueous dispersion in amounts up to 10 percent by weight based on weight of the aqueous dispersion.

21. The method of claim 15 in which the chelating agent is ethylenediamine tetraacetic acid.

22. The method of claim 15 in which the aqueous dispersion contains an azole.

23. The method of claim 22 in which the azole is benzotriazole.

24. The method of claim 22 in which the azole is present in the aqueous dispersion in amounts of at least 0.05 percent by weight based on weight of the aqueous dispersion.

* * * * *